United States Patent
Durairaj et al.

(10) Patent No.: US 11,276,109 B2
(45) Date of Patent: Mar. 15, 2022

(54) COMPUTERIZED SYSTEMS AND METHODS FOR LARGE-SCALE PRODUCT LISTING

(71) Applicant: Coupang Corp., Seoul (KR)

(72) Inventors: Baskar Durairaj, Redmond, WA (US); Haitao Jiang, Kirkland, WA (US); Yoonsik Um, Sammamish, WA (US)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 16/829,251

(22) Filed: Mar. 25, 2020

(65) Prior Publication Data
US 2021/0304118 A1 Sep. 30, 2021

(51) Int. Cl.
*G06Q 30/00* (2012.01)
*G06Q 30/06* (2012.01)
(Continued)

(52) U.S. Cl.
CPC ..... *G06Q 30/0641* (2013.01); *G06F 16/2365* (2019.01); *G06F 16/2379* (2019.01);
(Continued)

(58) Field of Classification Search
CPC ........... G06Q 30/0641; G06Q 30/0643; G06Q 30/0185; G06Q 10/10; G06Q 10/087;
(Continued)

(56) References Cited

U.S. PATENT DOCUMENTS

| 7,606,740 B2 | 10/2009 | Greaves et al. |
| 7,904,349 B1 * | 3/2011 | Hart ................... G06Q 30/0641 705/27.1 |

(Continued)

FOREIGN PATENT DOCUMENTS

| KR | 10-2013-0007360 | 1/2013 |
| KR | 10-2013-0017814 | 2/2013 |

(Continued)

OTHER PUBLICATIONS

"Amazon tracks sellers to monitor quality," Mint {New Delhi], Apr. 20, 2015 (Year: 2015).*
(Continued)

*Primary Examiner* — Anne M Georgalas
(74) *Attorney, Agent, or Firm* — Finnegan, Henderson, Farabow, Garrett & Dunner LLP

(57) ABSTRACT

Systems and methods are provided for updating product information on a webpage. One method comprises receiving, from a first seller, a first request to list at least one first product for sale on the webpage and receiving, from the first seller, product information associated with the at least one first product for sale. The method further comprises receiving, from the first seller, at least one image associated with the at least one first product for sale and providing the received product information associated with the at least one first product for sale to a workflow system, wherein the workflow system is configured to begin a first workflow to enter the product information into a database and configured to process multiple workflows substantially simultaneously. The first workflow may include listing the at least one first product for sale on the webpage.

15 Claims, 8 Drawing Sheets

(51) Int. Cl.
  *G06F 16/23* (2019.01)
  *G06F 16/958* (2019.01)
  *G06Q 10/08* (2012.01)
  *G06Q 10/10* (2012.01)
  *H04L 67/02* (2022.01)
  *H04L 67/06* (2022.01)

(52) U.S. Cl.
  CPC ......... *G06F 16/958* (2019.01); *G06Q 10/087* (2013.01); *G06Q 10/10* (2013.01); *G06Q 30/0185* (2013.01); *G06Q 30/0643* (2013.01); *H04L 67/02* (2013.01); *H04L 67/06* (2013.01)

(58) Field of Classification Search
  CPC ............... G06F 16/2379; G06F 16/958; G06F 16/2365; H04L 67/02; H04L 67/06
  See application file for complete search history.

(56) References Cited

U.S. PATENT DOCUMENTS

| | | | | |
|---|---|---|---|---|
| 8,078,505 | B2* | 12/2011 | Veres | G06Q 30/0601 705/27.1 |
| 8,160,928 | B2* | 4/2012 | VonBergen | G06Q 30/0641 705/26.1 |
| 8,359,245 | B1* | 1/2013 | Ballaro | G06Q 30/0635 705/27.1 |
| 8,442,873 | B2* | 5/2013 | Breaux | G06Q 30/0635 705/26.81 |
| 8,458,054 | B1* | 6/2013 | Thakur | G06Q 30/0603 705/27.1 |
| 8,527,369 | B1* | 9/2013 | Yalamanchi | G06Q 30/0641 705/27.1 |
| 2004/0128224 | A1* | 7/2004 | Dabney | G06Q 30/08 705/37 |
| 2005/0065981 | A1* | 3/2005 | Blinn | G06Q 10/10 |
| 2006/0095397 | A1* | 5/2006 | Torres | G06F 16/958 |
| 2011/0161182 | A1 | 6/2011 | Racco | |
| 2011/0197061 | A1* | 8/2011 | Chou | H04L 9/006 713/156 |
| 2011/0258083 | A1* | 10/2011 | Ren | G06Q 30/0641 705/27.1 |
| 2013/0073424 | A1* | 3/2013 | Lau | G06Q 30/06 705/26.8 |
| 2013/0290172 | A1* | 10/2013 | Mashinsky | G06Q 20/387 705/39 |
| 2014/0032380 | A1* | 1/2014 | Liu | G06Q 10/087 705/28 |
| 2018/0068400 | A1* | 3/2018 | Burris | H04W 4/021 |
| 2020/0118137 | A1* | 4/2020 | Sood | G06F 3/04817 |

FOREIGN PATENT DOCUMENTS

| | | |
|---|---|---|
| KR | 10-2013-0114641 | 10/2013 |
| KR | 10-2014-0079752 | 6/2014 |
| KR | 10-2015-0126433 | 11/2015 |
| KR | 10-1986672 | 6/2019 |
| TW | 202009736 | 3/2020 |

OTHER PUBLICATIONS

Preliminary Search Report dated Aug. 12, 2020, related to Korean Application No. KR 10-2020-0057373, 12 pages.
Notice of Preliminary Rejection dated Dec. 3, 2020, by the Korean Patent Office in Korean Application No. 10-2020-0057373, 11 pages.
International Search Report and Written Opinion dated Apr. 1, 2021 in counterpart PCT International Application PCT/IB2020/062341, 10 pages.
Office Action dated Aug. 6, 2021, by the Taiwanese Patent Office in Taiwanese Patent Application No. 109146599, 31 pages.
Notice of Preliminary Rejection dated Nov. 4, 2021, by the Korean Patent Office in counterpart Korean Patent Application No. 10-2021-0080173, 10 pages.

* cited by examiner

| 11/28/2018 | Shopping Cart |

| General Purchasing (1) | Periodic Delivery (0) |

☑ Select All   Product Information   Item Amount   shipping fee

Rocket shipping products  free shipping

☑ 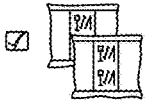 Mozzarella cheese, 1kg, 2 pieces
Tomorrow (Thursday) 11/29
Arrival guarantee (order before 12 pm)      20,510 won   [1 ▼]   free

| Even if you add other rocket shipping products, free shipping available | shipping Free   Order amount
$20.00

☑ Select All (1/1)  [Delete all]  [sold out / discontinued products clear all]   [interest payment]

$___.00

[Continue shopping]  [Buy now]

Customers who bought this product also purchased

1/5

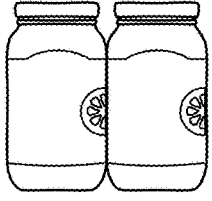      

Rosé spaghetti sauce, 600g, 2 pieces
6,500 won
(54 won per 10g)

Napoli Chunky Tomato Pasta Sauce,
3,800 won
(86 won per 10g)

Grated Parmesan cheese,
6,460 won
(285 won per 10g)

Bacon and Mushroom Cream Pasta Sauce,
4,870 won
(108 won per 10g)

START

401 Receive, from a first seller, a first request to list at least one first product for sale on the webpage.

402 Receive, from the first seller, product information associated with the at least one first product for sale

403 Receive, from the first seller, at least one image associated with the at least one first product for sale

404 Provide the received product information associated with the at least one first product for sale to a workflow system, wherein the workflow system is configured to begin a first workflow to enter the product information into a database and configured to process multiple workflows substantially simultaneously

405 Associate metadata with the at least one first product for sale based on the product information associated with the at least one first product for sale.

406 Validate the received product information associated with the at least one first product for sale based on the associated metadata.

407 Store the validated product information associated with the at least one first product for sale in the database

408 List the at least one first product for sale on the webpage

409 Send a notification of the listing associated with the at least one first product for sale to the first seller

END

COMPUTERIZED SYSTEMS AND METHODS FOR LARGE-SCALE PRODUCT LISTING

TECHNICAL FIELD

The present disclosure generally relates to computerized systems and methods for updating product information on a webpage. In particular, embodiments of the present disclosure relate to inventive and unconventional systems for multiple sellers or vendors to simultaneously list and update product information in real-time.

BACKGROUND

Many sellers (hereinafter interchangeable with "vendors") list their products for sale online for consumers to purchase. In order to list new products and update product information (e.g., product identifier, seller/vendor identifier, pricing information, shipping information, quantity/inventory information, or product image) for products that are already listed, sellers may use a system that connects to the webpage on which their products may be listed for sale.

The existing systems and methods for listing new products and updating existing product information, however, are insufficient. They require a synching process to list new products and update existing product information. Because the existing methods require sellers to wait for the completion of a synching process before their updates are implemented, the existing methods are difficult to scale up for an increasing number of sellers and products. Furthermore, the existing methods cannot handle a large number of sellers simultaneously attempting to list or update more than one product.

Therefore, there is a need for improved methods and systems for reducing the time needed for updating product information of a large amount of sellers or products on a webpage in real-time.

SUMMARY

One aspect of the present disclosure is directed to a system for updating product information on a webpage. The system may comprise a memory storing instructions and at least one non-transitory storage medium comprising instructions that, when executed by the at least one processor, cause the at least one processor to perform steps. The steps may comprise receiving, from a first seller, a first request to list at least one first product for sale on the webpage; receiving, from the first seller, product information associated with the at least one first product for sale; and receiving, from the first seller, at least one image associated with the at least one first product for sale. The steps may further comprise providing the received product information associated with the at least one first product for sale to a workflow system, wherein the workflow system is configured to begin a first workflow to enter the product information into a database and configured to process multiple workflows substantially simultaneously, wherein the first workflow comprises associating metadata with the at least one first product for sale based on the product information associated with the at least one first product for sale. The steps may further comprise validating the received product information associated with the at least one first product for sale based on the associated metadata; storing the validated product information associated with the at least one first product for sale in the database; listing the at least one first product for sale on the webpage; and sending a notification of the listing associated with the at least one first product for sale to the first seller.

Another aspect of the present disclosure is directed to a method for updating product information on a webpage. The method may comprise receiving, from a first seller, a first request to list at least one first product for sale on the webpage; receiving, from the first seller, product information associated with the at least one first product for sale; and receiving, from the first seller, at least one image associated with the at least one first product for sale. The method may further comprise providing the received product information associated with the at least one first product for sale to a workflow system, wherein the workflow system is configured to begin a first workflow to enter the product information into a database and configured to process multiple workflows substantially simultaneously, wherein the first workflow comprises associating metadata with the at least one first product for sale based on the product information associated with the at least one first product for sale. The method may further comprise validating the received product information associated with the at least one first product for sale based on the associated metadata; storing the validated product information associated with the at least one first product for sale in the database; listing the at least one first product for sale on the webpage; and sending a notification of the listing associated with the at least one first product for sale to the first seller.

Yet another aspect of the present disclosure is directed to a system for updating product information on a webpage. The system may comprise a memory storing instructions and at least one non-transitory storage medium comprising instructions that, when executed by the at least one processor, cause the at least one processor to perform steps. The steps may comprise receiving, from a first seller, a first request to list at least one first product for sale on the webpage; and receiving, from the first seller, product information associated with the at least one first product for sale; receiving, from the first seller, at least one image associated with the at least one first product for sale. The steps may further comprise providing the received product information associated with the at least one first product for sale to a workflow system, wherein the workflow system is configured to begin a first workflow to enter the product information into a database and configured to process multiple workflows substantially simultaneously, wherein the first workflow comprises associating metadata with the at least one first product for sale based on the product information associated with the at least one first product for sale. The steps may further comprise validating the received product information associated with the at least one first product for sale based on the associated metadata; storing the validated product information associated with the at least one first product for sale in the database; storing a timestamp for each performed step of the workflow system; if a performed step fails, storing a reason for the failed step and sending a message indicating the reason for the failed step to the seller; listing the at least one first product for sale on the webpage; and sending a notification of the listing associated with the at least one first product for sale to the first seller.

Other systems, methods, and computer-readable media are also discussed herein.

BRIEF DESCRIPTION OF THE DRAWINGS

FIG. 1D depicts a sample Cart page that includes items in a virtual shopping cart along with interactive user interface elements, consistent with the disclosed embodiments.

FIG. 4 depicts an exemplary process for updating product information on a webpage, consistent with the disclosed embodiments.

DETAILED DESCRIPTION

Figure 1A:
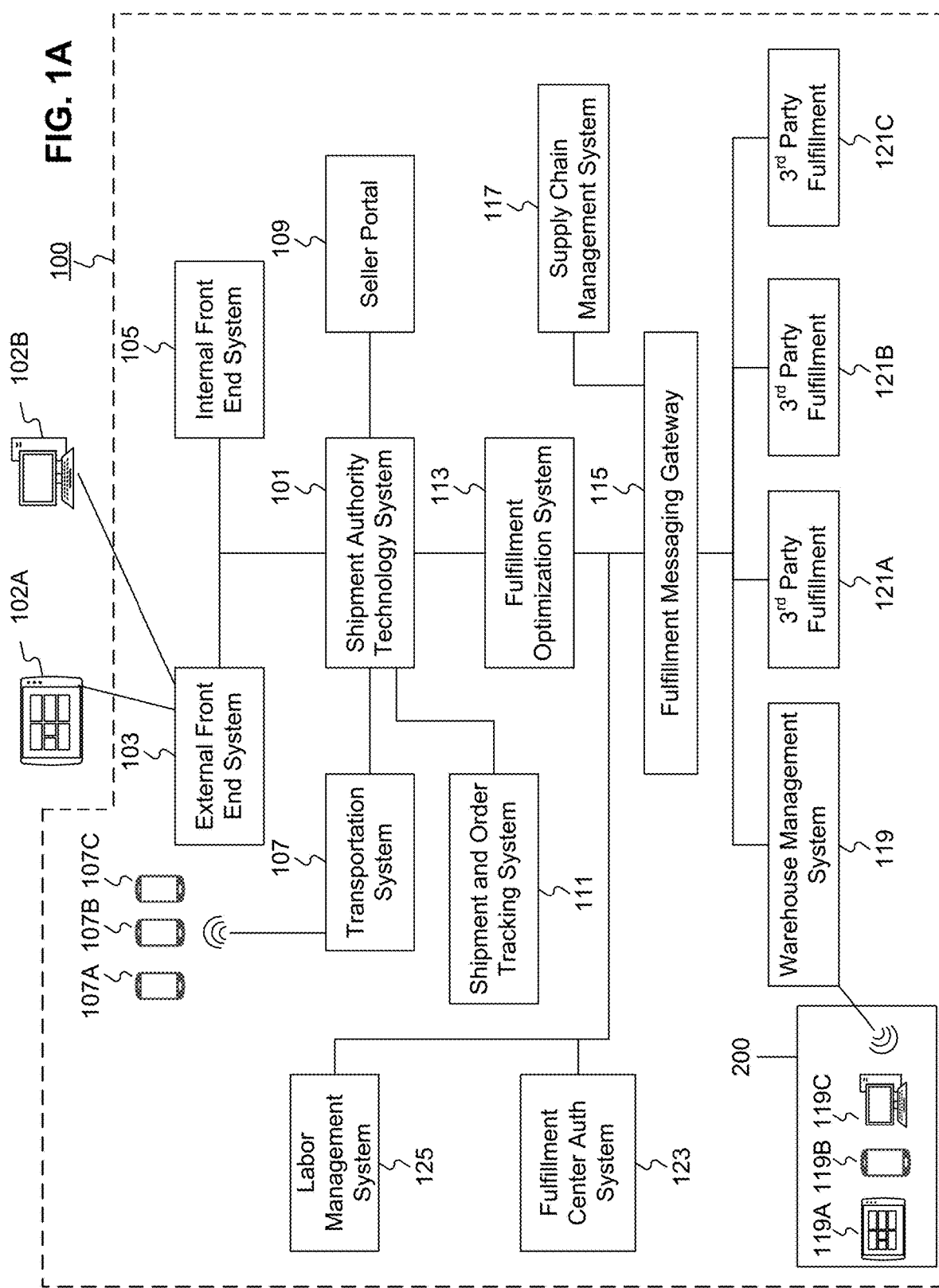
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
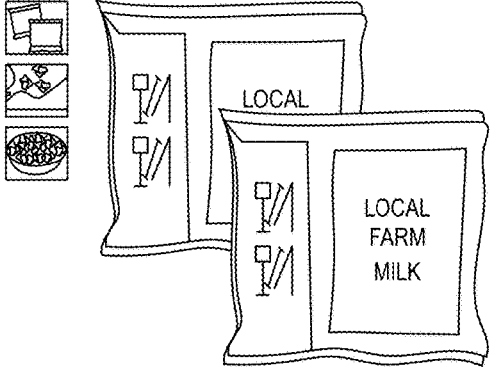
FIG. 1C depicts a sample Single Detail Page (SDP) that includes a product and information about the product along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for updating product information on a webpage. The disclosed embodiments are advantageously capable of listing new products and updating the product information of existing products of multiple sellers or vendors to simultaneously list and update product information in real-time. Product information may include a product identifier, store/vendor identifier, pricing information, shipping information, quantity/inventory information, or product image.

In one implementation, a first seller may use a seller device to send a request for listing at least one product for sale on a webpage to a seller listing system. After sending the request to the seller listing system, the first seller may send product information (e.g., product identifier, seller/vendor identifier, pricing information, shipping information, quantity/inventory information, or product image) associated with at least one product for sale to the seller listing system. Upon receiving the product information from the first seller, the seller listing system may use a metadata checker to associate metadata (e.g., category of product) with the at least one product for sale. Upon associating metadata with the at least one product for sale, the seller listing system may use a business validator to validate that the received product information is in accordance with the business model associated with the metadata. The seller listing system may then store the validated product information in a database, list the at least one product for sale on the webpage, and send a notification of the listing to the first seller.

In some embodiments, more than one seller may simultaneously use seller devices to send multiple requests for listing at least one product for sale on the webpage to the seller listing system. The sellers may use different methods for sending product information to the seller listing system. For example, the first seller may use an Application Programming Interface (API) to submit product information to the seller listing system, a second seller may directly submit product information to the seller listing system, while a third seller may upload a spreadsheet including product information for at least one product to the seller listing system. Accordingly, the seller listing system may, simultaneously for the first, second, and third sellers, use the metadata checker to associate metadata with all of the products for sale, the business validator to validate that the received product information is in accordance with the respective business models associated with the metadata, store the validated product information in the database, list all of the products for sale on the webpage, and send notifications of the listing to the first, second, and third sellers.

In some other embodiments, the seller listing system may use a global configuration system for connecting services in runtime mode, a distributed tracing system to gather timing data and troubleshoot latency issues, and a tiered quality of service (QoS) for prioritizing sellers. For example, the seller listing system may use the submitted product information to determine that the product information of a third seller should be validated before the product information of a first seller is validated.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
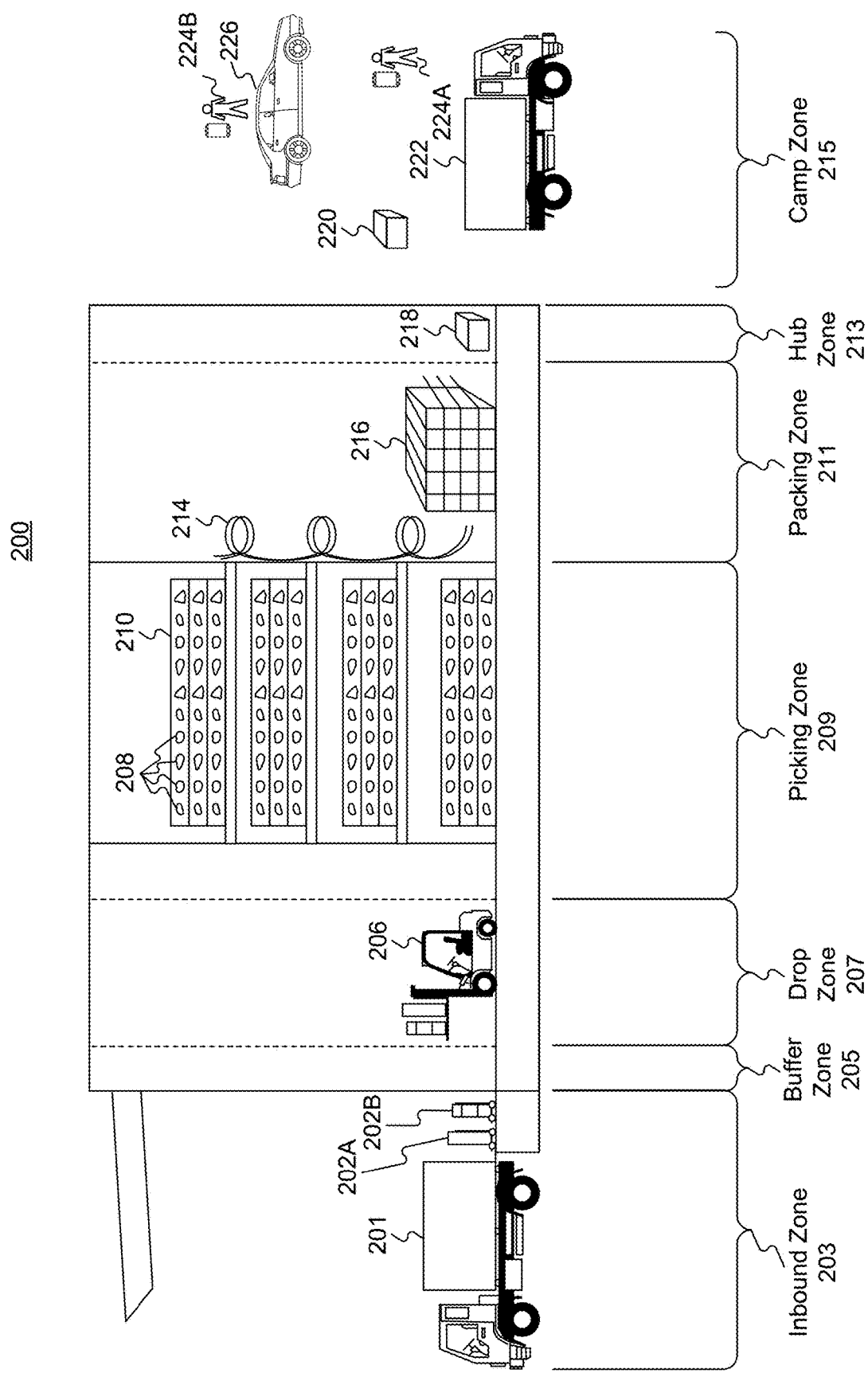
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
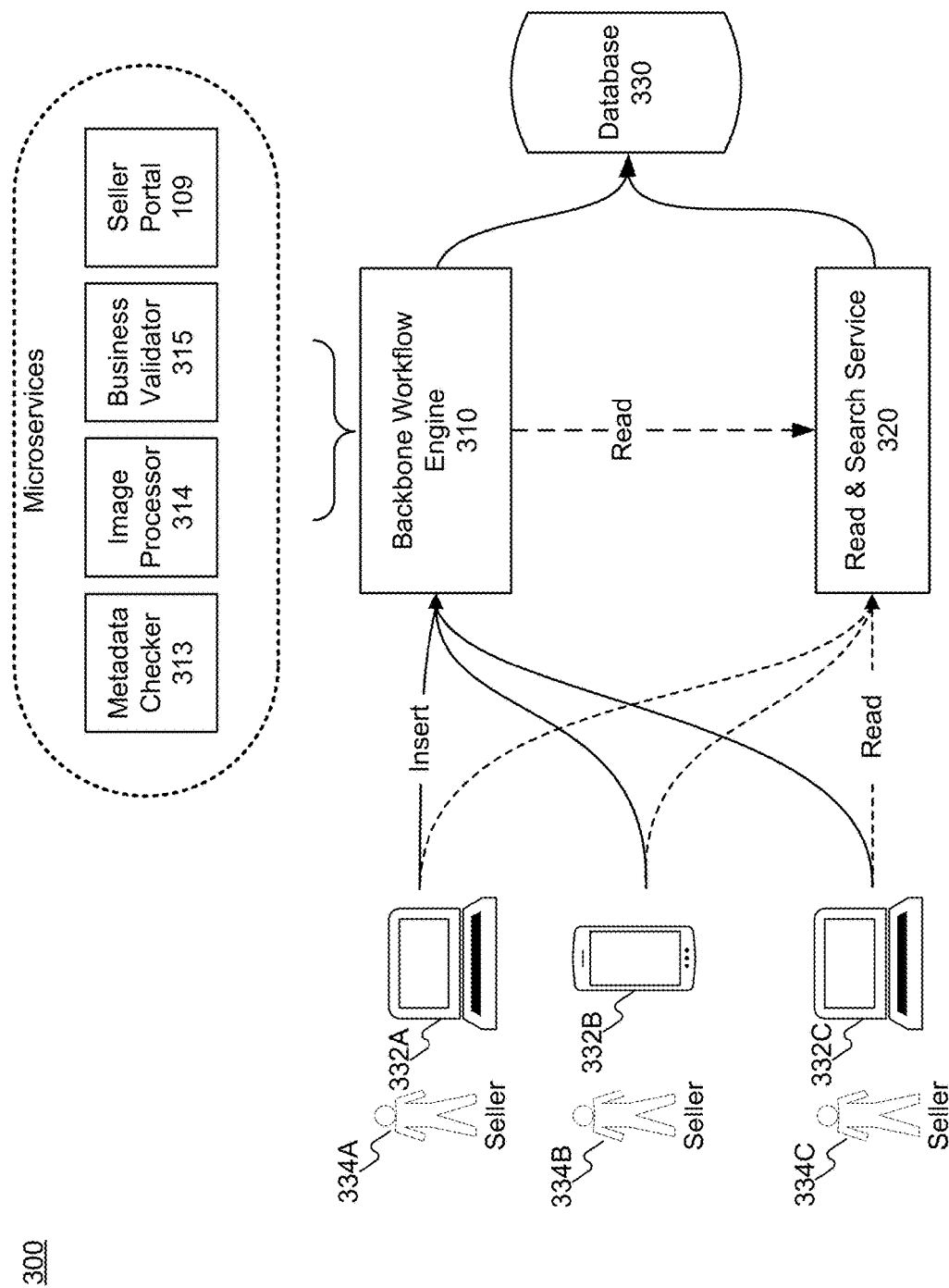
FIG. 3 is an exemplary network of devices and systems for updating product information on a webpage, consistent with the disclosed embodiments.

FIG. 3 is an exemplary network of devices and systems 300 for updating product information on a webpage is shown. As illustrated in FIG. 3, system 300 may include a backbone workflow engine 310 (e.g., Netflix Conductor), a read and search service ("read/search service") 320, and a database 330. Backbone workflow engine 310 and read/search service 320 may communicate with seller devices 332A, 332B, or 332C or with seller portal 109 (see, e.g., FIG. 1A) via a network. In some embodiments, backbone workflow engine 310 and read/search service 320 may communicate with components of system 100 and other systems (including seller devices 332A, 332B, 332C) via a direct connection, for example, using a cable.

System 300, in some embodiments, may be implemented as a scaled-up computer system that may quickly list and update product information on a webpage for multiple sellers simultaneously in real-time (e.g., writing 25,000 transactions per second, reading throughput of 40,000 per second, supporting 50 million business flow transactions daily, select latency of 2 milliseconds, insert latency of 10 milliseconds, reducing end-to-end lead time of transaction execution to 8 seconds with transparent traceability, etc.). System 300 and its components may comprise a single computer or may be configured as a distributed computer system including multiple computers that interoperate to perform one or more of the processes and functionalities associated with the disclosed examples. For example, backbone workflow engine 310 may run several processes driven by asynchronous orchestration of tasks executing on microservices. The processes may be long-running processes that are essential to posting product listings on the webpage. Some of the processes include managing the ingestion of data (e.g., product information) from sellers and managing product listing after validation. System 300 may use Representational State Transfer (REST) API JavaScript Object Notation (JSON) to define an execution flow (e.g., create, update, make queries, delete, or read operations). Microservices may include a metadata checker 313, an image processor 314, a business validator 315, and seller portal 109.

System 300 may define workflows (e.g., sellers submitting product listings) using a JSON-based domain-specific language (DSL). A workflow blueprint may define a series of tasks that needs to be executed by system 300. Each of the tasks may either be a control task (e.g., fork, join, decision, sub-workflow, etc.) or a worker task. Backbone workflow engine 310 may define tasks which may control a task's behavior. For example, a task definition may provide control parameters for each task such as timeouts, retry policies, etc. A task may be a worker task implemented by application or a system task executed by a server. In some embodiments, a task may include verifying that a seller's requested listing is correct or complete or listing the seller's product to a website.

In some embodiments, a first seller 334A may, via seller device 332A, send a request for listing at least one product for sale on a webpage to system 300. After sending the request to system 300, first seller 334A may send product information (e.g., product identifier, seller/vendor identifier, pricing information, shipping information, quantity/inventory information, or product image) associated with at least one product for sale to system 300 via seller device 332A. In some embodiments, seller 334B or seller 334C may, via seller device 332B or 332C, simultaneously interact with system 300 in a manner similar to that of seller 334A as explained above. For example, seller portal 109 and system 300 may list new products and update product information of existing products of multiple sellers simultaneously onto the webpage in real-time. Sellers 334A-C may use different methods for sending product information to system 300. For example, first seller 334A may use an API to submit product information to seller listing system 300, a second seller 334B may directly submit product information to system 300, while a third seller 334C may upload a spreadsheet including product information for at least one product onto the system 300. The APIs of system 300 may be exposed over HTTP to allow for ease of integration with different sellers. System 300 may include additional protocols that provide features such as authentication, bidirectional flow control, cancellations, timeouts, cross-platform seller and server bindings for many languages, connection between services in microservices, or connection between user devices.

Seller devices 332A-C may comprise a tablet, mobile device, computer, or the like. Seller devices 332A-C may include a display. The display may include, for example, liquid crystal displays (LCD), light emitting diode screens (LED), organic light emitting diode screens (OLED), a touch screen, and other known display devices. The display may show various information to a seller. Seller devices 332A-C may include one or more input/output (I/O) devices. The I/O devices may include one or more devices that allow seller devices 332A-C to send and receive information from sellers 334A-C or another device. The I/O devices may include various input/output devices, a camera, a microphone, a keyboard, a mouse-type device, a gesture sensor, an action sensor, a physical button, an oratory input, etc. The I/O devices may also include one or more communication modules (not shown) for sending and receiving information from seller listing system 300 by, for example, establishing wired or wireless connectivity between seller devices 332A-C and network 320.

Backbone workflow engine 310 may track and manage workflows (e.g., sellers submitting product listings) and may further pause, resume, and restart processes. Backbone workflow engine 310 may use a user interface (UI) to visualize process flows such that a seller may submit a request to system 300 to receive a notification of where its submitted product information is in the product listing process. Backbone workflow engine 310 may use the UI to monitor and troubleshoot workflow executions. The UI may allow for searches based on various parameters (e.g., input, output, etc.) and provide a visual presentation of the workflow blueprint and the paths taken during execution. The UI may provide details of each task execution for each workflow instance. The details may include timestamps for when a task was scheduled, timestamps for when a task was picked up by a worker application, timestamps for when a task was completed, reasons for task failure, number of retry attempts, host on which a task was executed, inputs provided to a task, and outputs from a task upon completion.

Backbone workflow engine 310 may include a state machine service that combines a workflow blueprint with the current state of the workflow, identify the next state, schedule tasks (e.g., associated with processing sellers' product listing requests), and update the status of the workflow as workflow events (e.g., task completion, failure, etc.) occur. The state machine service may manage scheduled tasks using a distributed queue. In some embodiments, the state machine service may evaluate the state of a workflow instance against the workflow blueprint and identify the next set of tasks to be scheduled or complete the workflow if all tasks are complete.

Backbone workflow engine 310 may include stateless worker applications. The worker applications may establish communications between user devices 332A-C and tasks. The worker applications may establish these communications by either implementing a REST endpoint that can be called by backbone workflow engine 310 or by implementing a polling loop that periodically checks for pending tasks. Backbone workflow engine 310 may achieve the same outcome when calling the REST endpoint one or more times. The polling model may handle backpressure on the worker applications and provide automatic scalability based on the queue depth. Backbone workflow engine 310 may inspect the workload size for each worker application that may be used to autoscale worker instances.

In some embodiments, image processor 314 may quickly download a file transfer protocol (FTP) image uniform resource locator (URL) or a cloud URL associated with the product for sale submitted by first seller 334A onto the webpage. The quick image download function of image processor 314 may reduce latency of first seller 334A's product information submission to system 300.

Upon receiving the product information from first seller 332A, metadata checker 313 may associate metadata (e.g., category of product) with the at least one product for sale. For example, the metadata may indicate that the product for sale is an electronic product. Upon associating metadata with the at least one product for sale, business validator 315 may validate that the received product information is in accordance with the business model associated with the metadata. For example, if the metadata indicates that the product for sale is an electronic product, the associated business model may indicate that electronic products are subject to mandatory certification schemes that ensure that only electronic products certified by the mandatory scheme can enter the market. Business validator 315 may validate the received product information by verifying that the associated product is properly certified. System 300 may store the validated product information in database 330, seller portal 109 may list the at least one product for sale on the webpage, and seller listing system 300 may send a notification of the listing to first seller 334A.

Accordingly, system may 300, simultaneously for first, second, and third sellers 334A-C, use metadata checker 313 to associate metadata with all of the products for sale, business validator 315 to validate that the received product information is in accordance with the respective business models associated with the metadata, store the validated product information in database 330, list all of the products for sale on the webpage via seller portal 109, and send notifications of the listing to first, second, and third seller devices 332A-C.

Database 330 may include a storage engine (e.g., Elasticsearch, Cassandra, etc.) for indexing execution flows. Database 330 may include computing components (e.g., database management system, database server, etc.) configured to receive and process requests for data stored in memory devices of the database(s) and to provide data from the database(s). In some embodiments, database 330 may take the form of servers, general purpose computers, mainframe computers, or any combination of these components. Database 330 may store data that may be used by system 300 for performing methods and processes associated with disclosed examples. Database 330 may be located in system 300 as shown in FIG. 3, or alternatively, it may be in an external storage device located outside of system 300. Data stored in database 330 may include any suitable process information data associated with steps performed by and interactions with system 300. For example, data stored in database 330 may include product information (e.g., product identifier, seller/vendor identifier, pricing information, shipping information, quantity/inventory information, or product image) submitted by a seller, processes and paths taken by system 300, task execution data (e.g., timestamps for when a task was scheduled, whether or not a task failed, reasons for task failure, number of retry attempts on a task, host on which a task was executed, inputs provided to a task, outputs from a task upon completion), steps performed by a metadata checker 313, steps performed by an image processor 314, or steps performed by a business validator 315.

Database 330 may enable horizontal scaling of datastore for a large volume of concurrent workflow executions (e.g., millions of workflows per day) and provide elastic scaling to meet high throughput demands. For example, database 330 may index products by their associated product information (e.g., product identifier, seller/vendor identifier, pricing information, shipping information, quantity/inventory information, or product image). When a seller submits a request to list products to system 300, read/search service 320 may search the indexed products in database 330 for relevant product information (e.g., has the seller already listed the product associated with the product). In some embodiments, read/search service 320 may search database 330 for a plurality of requests substantially simultaneously.

Database 330 may include main core components such as nodes, data centers, memory tables, clusters, commit logs, etc. In some embodiments, a cluster of database 330 may be distributed across different machines to handle failures and maintain replicas to maintain operations and transactions with high availability. For example, database 330 may have a replication factor that defines the number of copies of data across different machines to receive multiple copies of data to maintain fault tolerance and high availability. Database 330 may store and manage high velocity structured data and unstructured data across multiple commodity servers. In some embodiments, database 330 may have a decentralized architecture such that any node may perform any operation. All the nodes may be at the same level, which may provide flexible scalability for large amounts of data. Database 330 may add or remove any number of nodes from a cluster without disturbing the architecture. In some embodiments, database 330 may use a Restful distributed search by sending data using APIs.

In some embodiments, database 330 may use a table (e.g., CQL table) that may be considered as a group of partitions called the column family that contains rows with the same structure. Each partition may hold a unique partition key and each row may contain an optional singular cluster key. The combination of a partition and a cluster key is called a primary key, which is used to identify a row in the table. A table with a cluster key will have multi-row partitions whereas a table without a clustered key will only have single row partition.

Backbone workflow engine 310 may define user queries in the application workflow. Database 330 may receive the application workflow and a conceptual data model from backbone workflow engine 310. The conceptual data model may be used to capture the relationship between different entities and their attributes. Database 330 may produce a query-driven conceptual data design and use outlined mapping rules and mapping patterns to enable the transition from a conceptual model to a logical model. We then describe a physical model to get a completely unique mental image of the design. The conceptual data model is mapped to a logical data model based on queries defined in the application workflow. This query-driven conceptual to logical mapping is defined by data modeling principles, mapping rules, and mapping patterns received from backbone workflow engine 310.

In some embodiments, system 300 may use a global configuration system (e.g., Consul) for connecting services in runtime mode. The global configuration system may be used for feature flagging, coordination, and dynamic configuration. In some embodiments, the global configuration system may include multiple clients and servers to increase availability in the case of failure. The global configuration system may include agents in a datacenter that participate in a gossip protocol in order to automatically discover the configuration of clients with the addresses of servers. The gossip protocol allows detection of agent failures to be distributed rather than placed on the servers, resulting in more scalable failure detection. The gossip protocol also provides failure detection for the nodes. The gossip protocol is also used as a messaging layer to notify system 300 of important events (e.g., electing a single server to process all queries and transactions).

In some embodiments, system 300 may use a distributed tracing system (e.g., Zipkin) to gather timing data and troubleshoot latency issues. For example, system 300 may store trace data (e.g., timestamp and metadata for each performed step) in database 330. System 300 may validate, store and index trace data. System 300 may use a JSON API to retrieve the trace data. Sellers 334A-C may send a request for status information on their requested listing to system 300 and system 300 may determine the most recently performed step based on the most recently stored timestamp. System 300 may send messages indicating the most recently performed step to seller devices 332A-C. If a performed step fails, system 300 may store a timestamp associated with the failure and a reason for failure in database 330. System 300 may send messages indicating the reasons for the failed steps to seller devices 332A-C.

In some embodiments, system 300 may use a tiered QoS for prioritizing sellers. The tiered QoS may include specific quota or throttling policies for sellers with different priorities. For example, system 300 may control the sequence and speed of processing requests from sellers based on seller identification and product information (e.g., sellers that have a history of poorly formatted submission are given a low prioritization, sellers with high quality products and/or high product/seller ratings are given a high prioritization, etc.). Low quality sellers may also be banned from submitting new or updated listings. System 300 may use the submitted product information to determine the prioritization of the seller. Additionally, system 300 may facilitate self-service by providing specific feedback on submitted requests for new listings or updated listings so that sellers do not need to contact a support team to resolve submission issues. In some embodiments, system 300 may assign a seller rating to each seller for prioritization purposes. For example, system 300 may determine a score based on the seller's past fulfillment of orders (e.g., a percentage of fulfilled orders), the seller's past on-time delivery metrics (e.g., a percentage of orders delivered before or at an associated PDD), and the seller's replies to customer inquiries (e.g., a percentage of inquiries responded to within 24 hours). Additional or alternative metrics may be used to determine a seller rating, and one of ordinary skill will understand that other metrics are possible in some embodiments.

FIG. 4 depicts an exemplary process 400 for updating product information on a webpage, consistent with the disclosed embodiments.

In step 401, system 300 may receive, from a first seller (e.g., sellers 334A-C), a first request to list at least one first product for sale on a webpage. For example, the first seller may use a seller portal (e.g., seller portal 109) and a system (e.g., system 300) to list new products or update product information (e.g., product identifier, seller/vendor identifier, pricing information, shipping information, quantity/inventory information, or product image) of existing listed products. The first seller may use an API, directly submit, or upload a spreadsheet to submit product information to the system.

In step 402, system 300 may receive, from the first seller, product information (e.g., product identifier, seller/vendor identifier, pricing information, shipping information, quantity/inventory information, or product image) associated with the at least one first product for sale.

In step 403, system 300 may receive, from the first seller, at least one image associated with the at least one first product for sale. For example, the first seller may submit a FTP image URL or a cloud URL associated with the at least one first product for sale, which may be quickly downloaded by an image processor (e.g., image processor 314) included in system 300. The quick image download function of image processor 314 may reduce latency of the first seller's product information submission to system 300. Steps 401-403 may, in some embodiments, be consolidated (e.g., where each of the first request, product information, and at least one image may be received in the same communication.

In step 404, system 300 may provide the received product information associated with the at least one first product for sale to a workflow system, wherein the workflow system is configured to begin a first workflow to enter the product information into a database (e.g., database 330) and configured to process multiple workflows substantially simultaneously. Database 330 may include a storage engine (e.g., Elasticsearch, Cassandra, etc.) for indexing execution flows. For example, data stored in database 330 may include product information submitted by sellers, processes and paths taken by system 300, task execution data (e.g., timestamps for when a task was scheduled, whether or not a task failed, reasons for task failure, number of retry attempts on a task, host on which a task was executed, inputs provided to a task, outputs from a task upon completion), steps performed by metadata checker 313, steps performed by image processor 314, or steps performed by business validator 315. Database 330 may enable horizontal scaling of datastore for a large volume of concurrent workflow executions (e.g., millions of workflows per day) and provide elastic scaling to meet high throughput demands of multiple sellers. For example, database 330 may index products by their associated product information. When the first seller submits a request to list products to system 300, read/search service 320 may search the indexed products in database 330 for relevant product information (e.g., has the seller already listed the product associated with the product). In some embodiments, read/search service 320 may search database 330 for a plurality of requests simultaneously or substantially simultaneously.

In step 405, the first workflow of system 300 may associate metadata (e.g., category of product) with the at least one first product for sale based on the associated product information. For example, the metadata may indicate that the product for sale is an electronic product.

In step 406, the first workflow of system 300 may validate the received product information associated with the at least one first product for sale based on the associated metadata. For example, system 300 may include a business validator (e.g., business validator 315), which may validate that the received product information is in accordance with the business model associated with the metadata. That is, if the metadata indicates that the product for sale is an electronic product, the associated business model may indicate that electronic products are subject to mandatory certification schemes that ensure that only electronic products certified by the mandatory scheme can enter the market. The business validator may validate the received product information by verifying that the associated product is properly certified.

In step 407, the first workflow of system 300 may store the validated product information associated with the at least one first product for sale in the database (e.g., database 330).

In step 408, system 300 may list the at least one first product for sale on the webpage (e.g., via seller portal 109). System 300 may list the product by, for example, placing a link on a webpage, modifying a link or element of a webpage, or the like.

In step 409, system 300 may send a notification of the listing associated with the at least one first product for sale to the first seller.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for updating product information on a webpage, the system comprising:
　at least one processor;
　a memory storing instructions; and
　at least one non-transitory storage medium comprising instructions that, when executed by the at least one processor, cause the at least one processor to perform first steps comprising:
　　receiving, from a plurality of sellers, a plurality of requests to list a plurality of products for sale on the webpage, wherein each request of the plurality of requests is associated with at least one product for sale;
　　receiving, from the plurality of sellers, product information associated with the at least one product for sale;
　　receiving, from the plurality of sellers, at least one image associated with the at least one product for sale;
　　providing the received product information associated with the at least one product for sale to a workflow system, wherein the workflow system is configured to perform an asynchronous orchestration of tasks associated with the plurality of requests, wherein the tasks include a plurality of workflows to enter the product information into a database and wherein the workflow system is configured to process the plurality of workflows substantially simultaneously,
　　wherein each workflow of the plurality of workflows is associated with one product of the at least one product for sale;

wherein each of the plurality of workflows is configured to perform second steps comprising:
- associating metadata with the at least one product for sale based on the product information associated with the at least one product for sale;
- determining, based on historical data of each seller of the plurality of sellers and at least one product for sale associated with each seller of the plurality of sellers, a priority of each request of the plurality of requests;
- based on the determined priority, determining a sequence of validating the product information associated with each request of the plurality of requests;
- validating the received product information associated with the at least one product for sale based on the associated metadata;
- storing the validated product information associated with the at least one product for sale in the database;
- listing the at least one product for sale on the webpage; and
- sending a notification of the listing associated with the at least one product for sale to each seller of the plurality of sellers corresponding to the at least one product for sale.

2. The system of claim 1, wherein the product information comprises at least one of a product identifier or a seller identifier associated with at least one seller of the seller plurality of sellers.

3. The system of claim 1, wherein receiving the at least one image further comprises downloading at least one image associated with the at least one product for sale.

4. The system of claim 1, wherein the metadata comprises a category to which the at least one product for sale belongs.

5. The system of claim 4, wherein validating the received product information comprises associating the metadata with a business model.

6. The system of claim 1, wherein the first steps further comprise:
- storing a timestamp for each performed second step of each of the plurality of workflows;
- receiving, from at least one seller of the plurality of sellers; a request for status information on at least one of the plurality of requests;
- determining a performed second step of each of the plurality of workflows associated with a chronologically latest stored timestamp; and
- sending a message indicating the performed second steps associated with the chronologically latest stored timestamps to the at least one seller.

7. The system of claim 1, wherein the product information is received from the plurality of sellers via at least one of an application programming interface (API), the plurality of sellers directly modifying the webpage to insert the product information, or the plurality of sellers uploading a spreadsheet to the webpage.

8. A computer-implemented method for updating product information on a webpage, the method comprising:
- receiving, from a plurality of sellers, a plurality of requests to list a plurality of products for sale on the webpage, wherein each request of the plurality of requests is associated with at least one product for sale;
- receiving, from the plurality of sellers, product information associated with the at least one product for sale;
- receiving, from the plurality of sellers, at least one image associated with the at least one product for sale;
- providing the received product information associated with the at least one product for sale to a workflow system, wherein the workflow system is configured to perform an asynchronous orchestration of tasks associated with the plurality of requests, wherein the tasks include a plurality of workflows to enter the product information into a database and wherein the workflow system is configured to process the plurality of workflows substantially simultaneously,
- wherein each workflow of the plurality of workflows is associated with one product of the at least one product for sale;
- wherein each of the plurality of workflows is configured to perform steps comprising:
  - associating metadata with the at least one product for sale based on the product information associated with the at least one product for sale;
  - determining, based on historical data of each seller of the plurality of sellers and at least one product for sale associated with each seller of the plurality of sellers, a priority of each request of the plurality of requests;
  - based on the determined priority, determining a sequence of validating the product information associated with each request of the plurality of requests;
  - validating the received product information associated with the at least one product for sale based on the associated metadata;
  - storing the validated product information associated with the at least one product for sale in the database;
  - listing the at least one product for sale on the webpage; and
  - sending a notification of the listing associated with the at least one product for sale to each seller of the plurality of sellers corresponding to the at least one product for sale.

9. The method of claim 8, wherein the product information comprises at least one of a product identifier or a sever identifier associated with at least one seller of the plurality of sellers.

10. The method of claim 8, wherein receiving the at least one image further comprises downloading at least one image associated with the at least one product for sale.

11. The method of claim 8, wherein the metadata comprises a category to which the at least one product for sale belongs.

12. The method of claim 11, wherein validating the received product information comprises associating the metadata with a business model.

13. The method of claim 8, wherein the method further comprises:
- storing a timestamp for each performed step of each of the plurality of workflows;
- receiving, from at least one seller of the plurality of sellers, a request for status information on at least one of the plurality of requests;
- determining a performed step of each of the plurality of workflows associated with a chronologically latest stored timestamp; and
- sending a message indicating the performed steps associated with the chronologically latest stored timestamps to the at least one seller.

14. The method of claim 8, wherein the product information is received from the plurality of sellers via at least one of an application programming interface (API), the plurality of sellers directly modifying the webpage to insert the product information, or the plurality of sellers uploading a spreadsheet to the webpage.

15. A computer-implemented system for updating product information on a webpage, the system comprising:
- at least one processor;
- a memory storing instructions; and
- at least one non-transitory storage medium comprising instructions that, when executed by the at least one processor, cause the at least one processor to perform first steps comprising:
- receiving, from a plurality of sellers, a plurality of requests to list a plurality of products for sale on the webpage, wherein each request of the plurality of requests is associated with at least one product for sale;
- receiving, from the plurality of sellers, product information associated with the at least one product for sale;
- receiving, from the plurality of sellers, at least one image associated with the at least one product for sale;
- providing the received product information associated with the at least one first product for sale to a workflow system, wherein the workflow system is configured to perform an asynchronous orchestration of tasks associated with the plurality of requests, wherein the tasks include a plurality of workflows to enter the product information into a database and wherein the workflow system is configured to process the plurality of workflows substantially simultaneously,
- wherein each workflow of the plurality of workflows is associated with one product of the at least one product for sale;
- wherein each of the plurality of workflows is configured to perform second steps comprising:
- associating metadata with the at least one product for sale based on the product information associated with the at least one product for sale;
- determining, based on historical data of each seller of the plurality of sellers and at least one product for sale associated with each seller of the plurality of sellers, a priority of each request of the plurality of requests;
- based on the determined priority, determining a sequence of validating the product information associated with each request of the plurality of requests;
- validating the received product information associated with the at least one product for sale based on the associated metadata;
- storing the validated product information associated with the at least one product for sale in the database;
- storing a timestamp for each performed second step of each of the plurality of workflows;
- if a second step is not performed, storing a reason for the second step's failure to perform and sending a message indicating the reason to at least one seller of the plurality of sellers;
- listing the at least one product for sale on the wed page; and
- sending a notification of the listing associated with the at least one product for sale to each seller of the plurality of sellers corresponding to the at least one product for sale.

* * * * *

UNITED STATES PATENT AND TRADEMARK OFFICE
CERTIFICATE OF CORRECTION

PATENT NO. : 11,276,109 B2
APPLICATION NO. : 16/829251
DATED : March 15, 2022
INVENTOR(S) : Durairaj et al.

Page 1 of 1

It is certified that error appears in the above-identified patent and that said Letters Patent is hereby corrected as shown below:

In the Claims

In Claim 2, Column 21, Lines 29-30, "of the seller plurality of sellers." should read --of the plurality of sellers.--.

In Claim 6, Column 21, Line 44, "sellers; a request" should read --sellers, a request--.

In Claim 9, Column 22, Lines 40-41, "a sever identifier" should read --a seller identifier--.

In Claim 15, Column 24, Line 24, "on the wed page;" should read --on the webpage;--.

Signed and Sealed this
Twenty-eighth Day of June, 2022

Katherine Kelly Vidal
*Director of the United States Patent and Trademark Office*